United States Patent [19]

French et al.

[11] Patent Number: 4,500,445

[45] Date of Patent: Feb. 19, 1985

[54] CORROSION INHIBITED AQUEOUS SLURRIES

[75] Inventors: Eddie French, Manchester; Thomas G. Braga, St. Louis, both of Mo.

[73] Assignee: Petrolite Corporation, St. Louis, Mo.

[21] Appl. No.: 356,668

[22] Filed: Mar. 10, 1982

[51] Int. Cl.$^3$ .................................................. C09K 3/00
[52] U.S. Cl. ........................................ 252/387; 44/51;
422/15; 422/18; 106/14.12; 406/49; 252/389 R
[58] Field of Search ........... 252/389.2, 389.21, 389.23,
252/387, 8.5 B, 8.5 C; 44/1 C, 51; 422/15, 18;
106/14.05, 14.12; 406/46, 49; 51/321

[56] References Cited

U.S. PATENT DOCUMENTS

| | | | |
|---|---|---|---|
| 2,346,151 | 4/1944 | Burk et al. | 406/47 |
| 3,272,588 | 9/1966 | Fuchs | 422/18 |
| 3,751,371 | 8/1973 | Redmore et al. | 252/8.5 C X |
| 3,793,194 | 2/1974 | Zecher | 210/697 |
| 3,859,396 | 1/1975 | Alink | 252/8.5 C X |
| 3,909,447 | 9/1975 | Redmore et al. | 252/8.5 C X |
| 3,973,056 | 8/1976 | Fessler et al. | 252/387 |
| 3,996,058 | 12/1976 | Wasp | 252/387 |
| 3,997,293 | 12/1976 | Redmore | 252/8.5 C X |
| 4,000,076 | 12/1976 | Bodine et al. | 252/8.5 B X |
| 4,026,815 | 5/1977 | Kallfass et al. | 252/389 A X |
| 4,057,511 | 11/1977 | Bohnsack et al. | 252/389 A |
| 4,075,291 | 2/1978 | Redmore et al. | 252/8.5 C X |
| 4,089,651 | 5/1978 | Scott | 252/387 X |
| 4,129,337 | 12/1978 | Hosaka et al. | 406/47 |

FOREIGN PATENT DOCUMENTS

| | | | |
|---|---|---|---|
| 25385 | 2/1982 | Japan | 44/51 |
| 1408604 | 10/1975 | United Kingdom | 51/321 |
| 1538433 | 1/1979 | United Kingdom | 51/321 |

OTHER PUBLICATIONS

Nathan, C. C., Editor, *Corrosion Inhibitors*, National Association of Corrosion Engineers, 1973, pp. 256–257.

*Primary Examiner*—Ben R. Padgett
*Assistant Examiner*—Matthew A. Thexton
*Attorney, Agent, or Firm*—Sidney B. Ring; Leon Zitver

[57] ABSTRACT

This invention relates to the use of phospho-compositions, for example phosphates, pyrophosphates, polyphosphates, organophosphates, etc., as corrosion inhibitors in oxygen-containing aqueous systems of particulate matter such as slurries of solids, such as coal, etc.

21 Claims, No Drawings

CORROSION INHIBITED AQUEOUS SLURRIES

Historically, most people in the coal preparation field have attributed metal loss and failure to erosion by coal particles transported through the wash water systems employed in coal preparation. This conclusion was based on the observation that failures were more common at high velocity areas where wear showed a weight loss pattern usually indicative of erosion. However, chromates have been used successfully, thereby refuting the conclusion that the loss is totally a result of erosion.

Since chromates have been phased out due to environmental considerations, another approach is necessary. Oxygen scavengers are not feasible since the wash water systems are open circuits with ample opportunities throughout the plant for reoxygenation.

We have now discovered that metal loss in aqueous coal slurries is primarily due to oxygen corrosion which is enhanced by the erosion of the protective oxide film. Stated another way, metal loss is primarily due to oxygen corrosion although the rate of loss is affected by erosion of the protective oxide film due to abrasiveness and velocity of water.

We have also discovered that phospho-compounds such as phosphates, pyrophosphates, polyphosphates, organophospho-compositions, etc. are useful as corrosion inhibitors in aqueous systems of particulate matter such as solids, for example, coal, etc.

The preferred phospho-compositions employed in the system are phosphates, pyrophosphates, polyphosphates, organophospho-compositions, mixtures and/or salts thereof, e.g. potassium pyrophosphate. Specific examples include Tetrapotassium pyrophosphate (TKPP), 2-phosphono-1,2,4-butane tricarboxylic acid (PBS-AM).

The process is carried out by adding to the system an amount of the corrosion inhibitor which is sufficient to inhibit corrosion in the system.

The corrosion inhibitor should be soluble in the system in the amounts employed.

Relatively little phospho-compositions are deposited on the solid particles thus requiring relatively small amounts of inhibitors.

The amount of corrosion inhibitor employed will vary with the particular composition employed, the particular system, etc. In general, one employs the composition in amounts sufficient to impart corrosion protection. In general, one employs trace amounts such as from about 1 to 10,000 ppm, for example from about 5 to 5,000, such as from about 10 to 1,000 ppm, but preferably from about 10 to 1,000 ppm based on total weight of system including solids.

In practice, one generally employs from about 10 to 500 ppm, with an optimum of about 25 to 250 ppm. Although greater concentrations can be employed there is generally no commercial advantage in doing so. The upper limit is determined by economic conditions.

This invention is effective in protecting from corrosion the metallic equipment employed in such systems such as pipes, transmission lines, meters, tanks, pumps and other equipment, particularly those containing iron, steel and ferrous alloys, etc.

In practice, the pH is maintained at about neutral such as from about 6.0 to 8.0, for example about 6.0 to 7.5, but preferably about 6.5 to 7.0.

Examples of other phospho-compositions which can be employed include the following:
(1) derivatives of butyl acid phosphate
(2) derivatives of phenyl acid phosphate
(3) other water soluble phosphate containing compounds and/or salts.

The following examples are presented for purposes of illustration and not of limitation.

EXAMPLE A

The basic design of a laboratory apparatus contained the following major components, (1) a flush mounted probe attached to either a Petrolite ®M3010 or M2002 recording corrosion ratemeter which measured the corrosion rate by an established polarization technique, (2) a Yellow Springs Instrument model 54 oxygen meter and probe, (3) a standard combination pH electrode and meter and (4) an impeller type stirrer.

Wash water slurry used in these tests was essentially an aqueous coal slurry with 3 to 10% coal fines obtained from a coal preparation plant. The coal contained in the slurry was strip-mined and/or deep mined. The pH of the water was 6.8, being controlled in the plant by the addition of caustic.

The stirring rate, measured by a strobe light, was normally kept constant at 500 rpm.

After addition of inhibitor, the pH was regulated, if necessary, by NaOH or $H_2SO_4$.

Corrosion rates, under all conditions, were monitored until a near steady state rate was determined.

Corrosion tests were made using a flush mounted probe similar to a Petrolite ®M540E probe with 1020 mild steel testing surface by a polarization resistance meter, a PAIR instrument described in U.S. Pat. No. 3,406,101.

Protection is calculated in the usual manner from corrosion rate ($R_1$) of system without inhibitor and corrosion rate ($R_2$) in presence of particular inhibitor according to the formula $$\frac{R_1 - R_2}{R_1} \times 100 = \text{Percent protection}$$

The results of Example A are presented in the following Table AI.

TABLE AI

| Ex. | Type | Inhibitor | Conc., ppm | Blank Rate, mpy | Inhibited Rate, mpy | % Protection |
|---|---|---|---|---|---|---|
| 1 | Heavy metal | Dichromate | 500 | 43.0 | 11.3 | 74 |
| 2 | | | 1000 | 43.0 | 10.4 | 76 |
| 3 | Phosphate | TKPP | 64 | 51.0 | 34.5 | 32 |
| 4 | | | 128 | 43.8 | 15.0 | 66 |
| 5 | | | 192 | 51.0 | 7.5 | 85 |
| 6 | | | 256 | 51.0 | 7.0 | 86 |
| 7 | | PBS-AM | 32 | 43.3 | 40.3 | 6.9 |
| 8 | | | 64 | 43.3 | 40.3 | 6.9 |
| 9 | | | 160 | 43.3 | 29.8 | 31 |
| 10 | | | 280 | 43.3 | 24.4 | 44 |
| 11 | | | 320 | 37.9 | 13.5 | 64 |
| 12 | | | 384 | 43.3 | 15.8 | 64 |
| 13 | | | 640 | 43.3 | 16.3 | 62 |
| 14 | | 1:2 PBS-AM: TKPP | 48 | 40.0 | 29.4 | 27 |
| 15 | | | 96 | 40.0 | 19.4 | 52 |
| 16 | | | 144 | 40.0 | 8.1 | 80 |
| 17 | | | 192 | 40.0 | 6.0 | 85 |
| 18 | | | 288 | 40.0 | 6.7 | 83 |
| 19 | | $NH_4^+$ Butyl | 50 | 44.8 | 40.5 | 10 |

TABLE AI-continued

| Ex. | Type | Inhibitor | Conc., ppm | Blank Rate, mpy | Inhibited Rate, mpy | % Protection |
|---|---|---|---|---|---|---|
|  |  | Phosphate |  |  |  |  |
| 20 |  |  | 100 | 44.8 | 37.5 | 16 |
| 21 |  |  | 500 | 44.8 | 26.5 | 41 |
| 22 |  |  | 750 | 44.8 | 19.5 | 57 |
| 23 |  |  | 1250 | 44.8 | 10.8 | 76 |
| 24 |  |  | 2000 | 44.8 | 12.0 | 73 |

The results in Table AI indicate that by far Tetrapotassium pyrophosphate (TKPP), 2-phosphono-1,2,4-butane tricarboxylic acid (PBS-AM) and a 1:2 mixture of PBS-AM and TKPP are the most effective inhibitors tested.

In view of the effectiveness of TKPP, this corrosion inhibitor was used to demonstrate that the decrease in the electrochemical corrosion measured by the ratemeter corresponds to an appropriate decrease in actual weight loss. For these tests, a standard 3 pin electrode system was used in which the electrochemical corrosion rate was actually measured on the coupons on which the weight loss was determined.

These results, as shown in Table AII, indicate that electrochemical corrosion is the major cause of metal loss. Furthermore, in the uninhibited system the increased wear on the side of the coupons upon which collisions of the fines is favorable is consistent with an erosion-corrosion mechanism. This uneven wear, however, was not evident in the inhibited system, which again suggests that erosion of metal is not the actual mechanism of weight loss.

This arrangement gave a continuous blank or uninhibited rate for comparison to the rate on the inhibited corrosion probe. The corrosion rates were measured by the two probes on a two channel Petrolite®Model 2002 Corrosion Ratemeter with recorder. Measurement alternated between the two probes roughly every 5 minutes.

In all tests, the water contained oxygen in equilibrium with air ($\sim$8 ppm) and the pH was between 6.5 and 7.0.

Flow rates were measured at 14 gallons per minute by the bucket and stopwatch method, however, the necessity to use a $\frac{5}{8}$ inch hose on the end of the $\frac{3}{4}$ inch pipe when making the measurements gives some uncertainty in the flow rate. A correction for the pressure change due to the constriction can be calculated by comparing the cross-sectional areas of the $\frac{3}{4}$ inch pipe and $\frac{5}{8}$ inch hose. This suggests that the actual flow rate when corrosion measurements were made (hose disconnected) was probably closer to 20 gallons per minute. This corresponds to a flow velocity in the $\frac{3}{4}$ inch pipe of about 14 feet per second, which is comparable to the velocity in the high velocity areas of the plant.

The inhibition effects of TKPP, PBS-AM and at 1:2 mixture of PBS-AM:TKPP in the field test were determined and are summarized in Table B. As in the laboratory test TKPP was found to be the most effective corrosion inhibitor.

Similar results were obtained in a field test where the coal being processed was deep mined.

It is apparent from a comparison of the field and laboratory tests that a more corrosive condition was encountered in the field (field blanks$\sim$150–200 mpy; laboratory blanks$\sim$30–50 mpy). This could possibly be TABLE AII
COMPARISON OF ELECTROCHEMICAL CORROSION WEIGHT LOSS AND TOTAL WEIGHT LOSS

| Ex. | (TKPP), PPM | PERIOD OF TEST, HR. | AVERAGE ELECTRO-CHEM. CORR. RATE, MPY | WT. LOSS, CALC., ELECTRO-CHEM. | ACTUAL TOTAL WT. LOSS | | | AVERAGE | AVERAGE CORROSION RATE, TOTAL, MPY |
|---|---|---|---|---|---|---|---|---|---|
|  |  |  |  |  | A | B | C |  |  |
| 1 | 0 | 72 | 90 | 0.1364 | 0.0906 | 0.1077 | 0.1379 | 0.1121 ± 0.017 | 76 ± 11 |
| 2 | 200 | 288 | 15 | 0.0883 | 0.1064 | 0.0588 | 0.0854 | 0.0835 ± 0.017 | 14 ± 3 |

EXAMPLE B

Field Tests

A side stream field test was performed at a coal preparation plant. The side stream was attached to the wash water system at the primary wash cyclones. The coal being processed was strip-mined at an adjacent field.

The test apparatus was a horse shoe shaped section of $\frac{3}{4}$ inch PVC pipe with a total length of 8 feet. Positioned in the pipe were an oxygen meter, a pH electrode, two flush mounted polarization corrosion probes and a chemical injection point with a suitable pump which was used to supply inhibitor to the system. One corrosion probe was located ahead of the chemical injection point with the other downstream of the injection point.

due to the extremely high velocity condition of the field such that none or only a minimum amount of protective oxide layer is formed. Also, the lowest inhibited rate in the field ($\sim$18 mpy) was greater than the corresponding laboratory value ($\sim$7 mpy). However, in terms of percent protection, the inhibitors were more effective in the field than in the laboratory (for example, 50 ppm TKPP in the lab yields $\sim$25% protection whereas, 100 ppm of 50% TKPP=50 ppm TKPP in the field yields$\sim$72% protection).

The laboratory tests are shown to be reliable in the scanning of possible inhibitors for field use since not only were the three selected inhibitors effective but their order of effectiveness was predicted TKPP$\simeq$1:2 PBS-AM:TKPP>PBS-AM.

TABLE B
SIDE STREAM TEST RESULTS OF A FIELD COAL CIRCUIT; CYCLONE SEPARATORS

| EX. | INHIBITOR | CONCENTRATION (ACTIVE CONC.), PPM | UNINHIBITED | CORROSION RATES INHIBITED | % PROTECTION |
|---|---|---|---|---|---|
| 1 | TKPP | 85 (42.5) | 155 | 87 | 44 |
| 2 | (50%) | 100 (50) | 275 | 75 | aver. { 72.7 |
| 3 | (sol) | 100 (50) | 188 | 58 | 69 |

TABLE B-continued
SIDE STREAM TEST RESULTS OF A FIELD COAL CIRCUIT; CYCLONE SEPARATORS

| EX. | INHIBITOR | CONCENTRATION (ACTIVE CONC.), PPM | UNINHIBITED | CORROSION RATES INHIBITED | | % PROTECTION |
|---|---|---|---|---|---|---|
| 4 | | 100 (50) | 185 | 45 | 72.5 | 75.7 |
| 5 | | 150 (75) | 165 | 43* | | 74* |
| 6 | | 250 (125) | 152 | 18 | | 88 |
| 7 | PBS-AM | 170 (42.5) | 238 | 113 | | 53 |
| 8 | (25% solution) | 230 (57.5) | 195 | 80 | | 59 |
| 9 | 2:1 TKPP:PBS-AM | 100 (37.5) | 165 | 65 | | 61 |
| 10 | (37.5% solution) | 100 (37.5) | 190 | 105 | | 45 |

*Short term test with inhibited rate still dropping.

The above examples, both laboratory and field, indicate the following:

(1) The major corrosion in the wash water system of a coal preparation plant is basically caused by the presence of $O_2$.

(2) All observations in the laboratory and field are consistent with the mechanism that metal loss is caused by corrosion which is enhanced in high velocity areas by the erosion of the partially protective oxide film.

(3) TKPP, PBS-AM and combinations of the two are very effective inhibitors of this corrosion, with TKPP being the most effective.

This invention can be employed in any oxygen-containing aqueous slurry systems where corrosion is a problem such as the following:
(1) Coal washing
(2) Coal Slurry pipelines
(3) Ore washings
(4) Ore slurry pipelines
(5) Ore crushing.

We claim:

1. A non-chromate composition of matter comprising an aqueous oxygen-containing slurry of erosive particulate matter selected from the group consisting of ore and coal containing a corrosion inhibiting amount of a phosphocomposition selected from the group consisting of polyphosphate salts and mixtures thereof.

2. The composition of claim 1 where the particulate matter is coal.

3. The composition of claim 2 where the phospho-composition is a potassium pyrophosphate.

4. The composition of claim 1 where the phospho-composition is tetrapotassium pyrophosphate.

5. The composition of claim 4 which contains also 2-phosphono-1,2,4-butane tricarboxylic acid.

6. The composition of claim 5 where the proportion of 2-phosphono-1,2,4-butane tricarboxylic acid to tetrapotassium pyrophosphate is about 1:2.

7. A non-chromate process of inhibiting corrosion in aqueous oxygen-containing slurry systems of particulate matter selected from the group consisting of ore and coal in which erosion of metal occurs, which comprises introducing into such system a phospho-composition selected from the group consisting of polyphosphate salts and mixtures thereof.

8. The process of claim 7 where the particulate matter is ore.

9. The process of claim 1 where the particulate matter is coal.

10. The process of claim 9 where the phospho-compositions is a potassium pyrophosphate.

11. The process of claim 10 where the phospho-composition is tetrapotassium pyrophosphate.

12. The process of claim 11 where in addition to tetrapotassium pyrophosphate, 2-phosphono-1,2,4-butane tricarboxylic acid is also introduced into the aqueous oxygen-containing slurry system.

13. The process of claim 12 where the 2-phosphono-1,2,4-butane tricarboxylic acid is employed in a proportion of about 1:2 to the tetrapotassium pyrophosphate.

14. The process of claim 7 where the phospho-composition is a potassium pyrophosphate.

15. The process of claim 14 where the particulate matter is ore.

16. The process of claim 7 where the phospho-composition is tetrapotassium pyrophosphate.

17. The process of claim 16 where the particulate matter is ore.

18. The process of claim 17 where in addition to tetrapotassium pyrophosphate, 2-phosphono-1,2,4-butane tricarboxylic acid is also introduced into the aqueous oxygen-containing slurry.

19. The process of claim 18 where the 2-phosphono-1,2,4-butane tricarboxylic acid is employed in a proportion of about 1:2 to the tetrapotassium pyrophosphate.

20. The process of claim 16 where in addition to tetrapotassium pyrophosphate, 2-phosphono-1,2,4-butane tricarboxylic acid is also introduced into the aqueous oxygen-containing slurry.

21. The process of claim 20 where the 2-phosphono-1,2,4-butane tricarboxylic acid is employed in a proportion of about 1:2 to the tetrapotassium pyrophosphate.

* * * * *